United States Patent
Carson et al.

(10) Patent No.: US 8,732,109 B1
(45) Date of Patent: May 20, 2014

(54) STRUCTURED REQUIREMENT GENERATION AND ASSESSMENT

(75) Inventors: Ronald Steven Carson, Renton, WA (US); James Warren Foust, Buena Park, CA (US); Michele Gay Michalski, Kent, WA (US); Sook Kenna Kim, Newport Coast, CA (US); David G. Bond, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 13/194,005

(22) Filed: Jul. 29, 2011

(51) Int. Cl.
*G06F 17/00* (2006.01)
*G06N 5/02* (2006.01)

(52) U.S. Cl.
USPC .......................................................... 706/47

(58) Field of Classification Search
None
See application file for complete search history.

(56) References Cited

U.S. PATENT DOCUMENTS

| | | | |
|---|---|---|---|
| 5,963,938 A * | 10/1999 | Wilson et al. ........................ 1/1 |
| 8,136,143 B2 | 3/2012 | Hannel et al. |
| 8,339,946 B2 | 12/2012 | Barbaresi et al. |
| 8,448,170 B2 | 5/2013 | Wipfel et al. |
| 8,494,928 B2 | 7/2013 | Ebling et al. |
| 2008/0228609 A1 * | 9/2008 | Ebling et al. .................... 705/30 |
| 2009/0303940 A1 * | 12/2009 | Barbaresi et al. ............. 370/329 |
| 2011/0072135 A1 * | 3/2011 | Hannel et al. .................. 709/225 |
| 2011/0126207 A1 * | 5/2011 | Wipfel et al. .................. 718/104 |

OTHER PUBLICATIONS

Nielsen "Documents as geometric objects: how to rank documents for full-text search", 2011, pp. 14 http://www.michaelnielsen.org/ddi/documents-as-geometric-objects-how-to-rank-documents-for-full-text-search/.*

Carson, "Keeping the Focus During Requirements Analysis", pp. 1-9, The Boeing Company, Seattle, WA.

Piraino et al., "Putting It All Together: Entity Relationships Between Requirements, Components of System Design, and Verification to Requirements", pp. 1-8, Medtronic Physio-Control Corporation, Redmond, WA.

Halligan, "Requirements Quality Metrics: The Basis of Informed Requirements Engineering Management", pp. 1-19, Project Performance (Australia) Pty Ltd, Australia. Retrieved on Jun. 21, 2011. http://www.ppi-int.com/newsletter/SyEN-013.php#article.

"About Requirements Assistant", pp. 1, Sunny Hills Consultancy BV, Requirements Analysis Department, Apeldoorn, The Netherlands. Retrieved on Jun. 21, 2011. http://www.requirementassistant.nl.

"Teamcenter for Systems Engineering: White Paper—A holistic approach to understanding complex products and reducing business and engineering risk," Siemens Product Lifecycle Management Software Inc., copyright 2011, 17 pages, accessed Sep. 6, 2013, http://m.plm.automation.siemens.com/en_us/Images/Siemens-PLM-Teamcenter-Systems-Engineering-wp_tcm1224-5906.pdf.

Carson et al., "Structured Requirement Generation and Assessment," U.S. Appl. No. 14/020,544, filed Sep. 6, 2013, 89 pages.

Nielsen, "Documents as geometric objects: how to rank documents for full-text search," Data-Driven Intelligence, Jul. 7, 2011, 9 pages, accessed Jan. 29, 2014, http://www.michaelnielsen.org/ddi/documents-as-geometric-objects-how-to-rank-documents-for-full-text-search/.

* cited by examiner

*Primary Examiner* — Li-Wu Chang
(74) *Attorney, Agent, or Firm* — Yee & Associates, P.C.

(57) ABSTRACT

A method and apparatus comprising a requirement generator and a quality assessor. The requirement generator is configured to generate a group of elements of a requirement. The quality assessor is configured to identify a quality level for the elements based on words in the elements and quality criteria.

10 Claims, 8 Drawing Sheets

STRUCTURED REQUIREMENT GENERATION AND ASSESSMENT

BACKGROUND INFORMATION

1. Field

The present disclosure relates generally to requirements for products and services and, in particular, to tools for helping a writer of requirements to generate requirements. Still more particularly, the present disclosure relates to a method and apparatus for providing a structure for writing a requirement and for providing an assessment of the quality of the requirement to the writer as the requirement is being written.

2. Background

Written requirements are used to communicate the mandatory characteristics of items. For example, an acquirer of items uses requirements to communicate the mandatory characteristics of items to be purchased to a supplier. These items may be products, services, or both.

The requirements may become part of the contract or other agreement between the acquirer and the supplier. The supplier then uses the requirements to develop the items. In some cases, the supplier may employ a requirements management tool to ensure that the items are developed in a manner that satisfies the requirements. Finally, the items delivered to the acquirer may be checked against the requirements to determine whether or not the items satisfy the requirements.

To improve communication between acquirer and supplier, it is desirable that requirements describe the mandatory characteristics of items in an unambiguous manner. Current systems and methods for generating requirements may be less effective than desired for consistently generating requirements that can be understood as clearly as desired.

Accordingly, it would be advantageous to have a method and apparatus that takes into account one or more of the issues discussed above, as well as possibly other issues.

SUMMARY

An advantageous embodiment of the present disclosure provides an apparatus comprising a requirement generator and a quality assessor. The requirement generator is configured to generate a group of elements of a requirement. The quality assessor is configured to identify a quality level for the elements based on words in the elements and quality criteria.

Another advantageous embodiment of the present disclosure provides an apparatus comprising an identifier module and a formatter module. The identifier module is configured to identify a type of a requirement. The formatter module is configured to display a format for the requirement based on the type of the requirement and to display fields to receive a user input for elements of the requirement.

Another advantageous embodiment of the present disclosure provides a method for generating a requirement. An identification of a type of a requirement is received. Fields to receive a user input for elements of the requirement are displayed based on the type of the requirement. A group of the elements of the requirement is received. A quality level for the elements is identified based on words in the elements and quality criteria. A quality level for the requirement is identified based on the quality levels for the elements. The elements, a representation of the quality level for the elements, the requirement, and a representation of the quality level for the requirement are displayed simultaneously.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

The different advantageous embodiments recognize and take into account a number of different considerations. "A number", as used herein with reference to items, means one or more items. For example, "a number of different considerations" are one or more different considerations.

The different advantageous embodiments recognize and take into account that, in industry, poor-quality requirements lead to schedule delays and increased costs during the development of various items. Unambiguous requirements are desirable for enabling accurate estimates of system development program technical needs and associated schedules and costs.

The different advantageous embodiments also recognize and take into account that some current approaches to generating structured requirements rely on specialized language with unique syntax, key words, and delimiters. Other current systems and methods for generating requirements lack a useful graphical user interface or require expertise in handling database information. Such approaches are difficult to use and require extensive user training.

The different advantageous embodiments also recognize and take into account that current methods for generating requirements do not provide feedback regarding the quality of a requirement as the requirement is being written. Thus, the requirement writer does not know which parts of the requirement need to be modified or how they may be changed to improve the quality of the requirement.

One or more of the advantageous embodiments provides a system and method for generating consistently high-quality unambiguous requirements using natural language. A method and apparatus in accordance with an advantageous embodiment assists a user to identify the type of a requirement to be generated. A method and apparatus in accordance with an advantageous embodiment provides guidance regarding which elements should be included in the requirement based on the type of requirement identified. A method and apparatus in accordance with an advantageous embodiment also provides an assessment of the quality of the individual elements of the requirement and of the requirement as a whole as the requirement is being written. The assessment indicates which elements may be modified to improve the quality of the requirement and how the elements should be modified.

Figure 1:
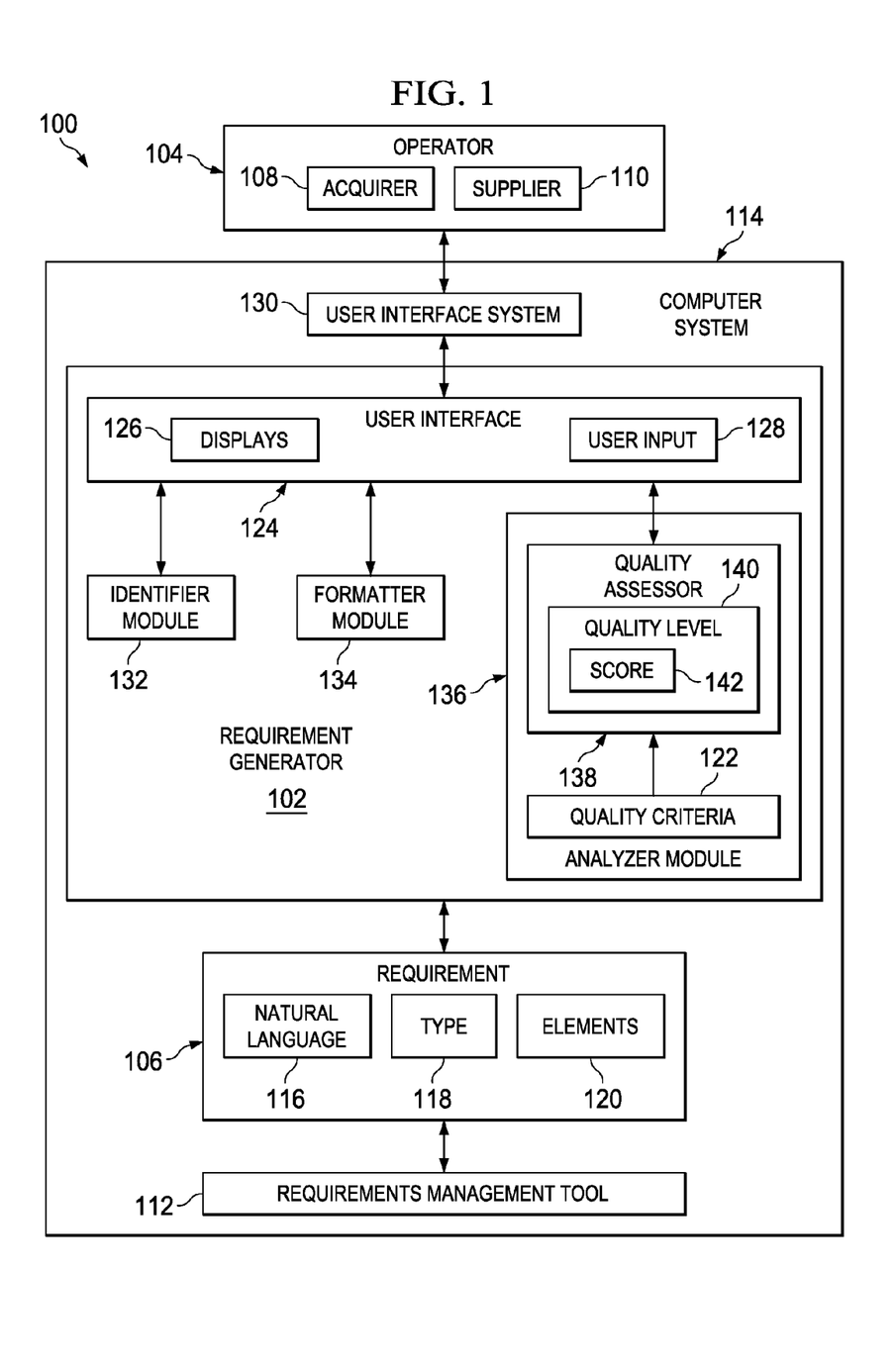
FIG. 1 is an illustration of a block diagram of a requirement generation environment in accordance with an advantageous embodiment.

Turning to FIG. 1, an illustration of a block diagram of a requirement generation environment is depicted in accordance with an advantageous embodiment. Requirement generation environment 100 includes requirement generator 102. Requirement generator 102 is used by operator 104 to generate requirement 106. For example, without limitation, requirement 106 may be a written description of a mandatory or other characteristic of a system, service, or other product or item.

For example, without limitation, operator 104 may be a writer of requirements for acquirer 108 or for supplier 110. Acquirer 108 may use requirement generator 102 to generate requirements for items or services to be purchased by acquirer 108 from supplier 110. Requirements generated using requirement generator 102 may be included in a contract or other agreement between acquirer 108 and supplier 110 to describe the items or services to be delivered under the contract or other agreement. In this case, the items or services delivered by supplier 110 to acquirer 108 may be checked against the requirements generated using requirement generator 102 to determine whether or not the terms of the contract or other agreement have been satisfied.

Supplier 110 may use requirement generator 102 to generate requirements that will be used by supplier 110 during the process of developing items for or providing services to acquirer 108. In this case, requirements generated using requirement generator 102 may be used by supplier 110 in requirements management tool 112. Requirements management tool 112 may be any tool that enables management and traceability of requirements for development of items or services, or both. Requirements management tool 112 is used in a development environment to track requirements from inception throughout a project life cycle. It is used to ensure that requirements get implemented and tested prior to project completion. An example of requirements management tool 112 includes, without limitation, Dynamic Object Oriented Requirements System (DOORS), available from International Business Machines.

The functions of requirement generator 102 may be implemented in hardware or in a combination of hardware and software in computer system 114. Computer system 114 may be a single computer or multiple computers operating together in any network configuration. Computer system 114 may be any electronic device or combination of devices that may be configured to perform the functions of requirement generator 102 as described herein.

Requirements management tool 112 may be implemented on computer system 114 along with requirement generator 102 or may be implemented separately from requirement generator 102. In one advantageous embodiment, requirement generator 102 may be implemented as part of requirements management tool 112. For example, without limitation, the functions provided by requirement generator 102 may be implemented using a programming functionality provided by requirements management tool 112.

In accordance with an advantageous embodiment, requirement 106 is generated by operator 104 in natural language 116. For example, without limitation, requirement 106 may be in the form of a statement in natural language 116. Natural language 116 is a language used by humans to communicate with each other. Natural language 116 also may be referred to as an ordinary language. Natural language 116 is any language which arises in an unpremeditated fashion as the result of the innate facility for language possessed by the human intellect. Natural language 116 is distinguished from constructed languages and formal languages, such as computer-programming languages. For example, without limitation, natural language 116 may be English or another natural language.

In accordance with an advantageous embodiment, requirement 106 is identified by type 118 and is formed of a combination of elements 120. Type 118 defines characteristics of individual elements 120 and the arrangement of elements 120 which form requirement 106. Type 118 also defines quality criteria 122 that are used to assess the quality of elements 120 and of requirement 106. One or more elements 120 may be optional for a given type 118 of requirement 106.

Elements 120 include phrases or one or more combinations of words. Elements 120 are combined in a particular order to form requirement 106. The arrangement of words within elements 120 and the arrangement of elements 120 forming requirement 106 are subject to rules of grammar, such as rules of grammar for natural language 116.

In accordance with an advantageous embodiment, requirement generator 102 provides user interface 124. For example, user interface 124 may be a graphical user interface that provides displays 126 and is configured to receive user input 128. User interface 124 may present displays 126 to operator 104 on user interface system 130. User interface 124 may receive user input 128 from operator 104 via user interface system 130. User interface system 130 may be a part of computer system 114 or may be separate from but connected to computer system 114. For example, without limitation, user interface system 130 may include output devices, such as computer monitors or other display devices. For example, without limitation, user interface system 130 may include input devices, such as a keyboard, touch screen, mouse, touch pad, or other input device.

In accordance with an advantageous embodiment, identifier module 132, formatter module 134, and analyzer module 136 receive information from operator 104 via user interface 124 and provide information to operator 104 via user interface 124. Identifier module 132, formatter module 134, and analyzer module 136 may be implemented in hardware, software, or a combination of hardware and software.

In accordance with an advantageous embodiment, identifier module 132 is configured to identify type 118 of requirement 106 to be generated. Identifier module 132 may be configured to provide displays 126 to assist operator 104 to identify type 118 of requirement 106 to be generated. Identifier module 132 may be configured to receive user input 128 identifying type 118 of requirement 106 to be generated.

In accordance with an advantageous embodiment, formatter module 134 is configured to receive elements 120 forming requirement 106 in a desired structure. Formatter module 134 may be configured to provide displays 126 displaying a format for requirement 106 based on type 118. Formatter module 134 may be configured to provide displays 126 displaying fields to receive user input 128 for elements 120 of requirement 106.

In accordance with an advantageous embodiment, analyzer module 136 is configured to generate an analysis of user input 128 for elements 120 of requirement 106. For example, analyzer module 136 may include quality assessor 138. Quality assessor 138 is configured to identify quality level 140 for each of elements 120. For example, quality assessor 138 may be configured to identify quality level 140 for each of elements 120 based on the words in each of elements 120 and quality criteria 122.

Quality assessor 138 also may be configured to identify quality level 140 for requirement 106 based on quality level 140 for elements 120. Quality level 140 for requirement 106 may be identified by applying weightings to the quality levels for various elements 120. The weightings may be fixed based on type 118 of requirement 106. Alternatively, the weightings may be selectable by operator 104. For example, operator 104 may be prompted to select the weightings via user interface 124.

Quality assessor 138 may be configured to provide displays 126 of representations of quality level 140 for elements 120 and for requirement 106 as operator 104 is writing requirement 106. By displaying quality level 140 in this manner, operator 104 knows which elements 120 to modify to increase the quality of requirement 106 being written.

Quality criteria 122 may be used to associate the words in elements 120 of requirement 106 with quality level 140. Quality level 140 indicates the degree to which a requirement or an element of a requirement clearly expresses the mandatory characteristics of an item. Using a requirement having a higher quality level reduces the risk of miscommunication. A higher quality requirement makes it easier to check an item against the requirement as the item is being developed and to determine whether the requirement is satisfied when the item is delivered.

Quality criteria 122 may be expressed and saved in any desired format for use by quality assessor 138. For example, quality criteria 122 may be saved in any desired database or data structure. Quality criteria 122 may be established using any desired standard or other method for identifying quality level 140 of requirement 106 based on the words forming elements 120 of requirement 106. For example, without limitation, quality criteria 122 may be used to determine quality level 140 based on whether or not content is missing in elements 120 and whether or not the content that is present in elements 120 is correct for the identified type 118 of requirement 106. In accordance with an advantageous embodiment, quality criteria 122 are used to identify quality level 140 for individual requirements and for individual elements forming such requirements.

In an illustrative example, quality level 140 may be an alphanumeric quality score 142. For example, score 142 may be a number or letter selected from a range of numbers or letters wherein each number or letter in the range corresponds to a different quality level. Score 142 may be selected from a range of scores comprising at least three different scores corresponding to at least three different quality levels. Thus, in accordance with an illustrative example, quality level 140 may be used to indicate more than a merely good or bad or pass or fail level of quality for elements 120 and for requirement 106.

The illustration of FIG. 1 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, requirement 106 may be generated in a format that is readily usable by requirements management tool 112. Alternatively or additionally, requirement 106 may be provided as an output by requirement generator 102 in any desired format. For example, without limitation, requirement 106 may be provided as an output for use in an electronic spreadsheet program, such as Excel. As another example, requirement 106 may be provided as a text file output for use by a word processor or other computer program.

Figure 2:
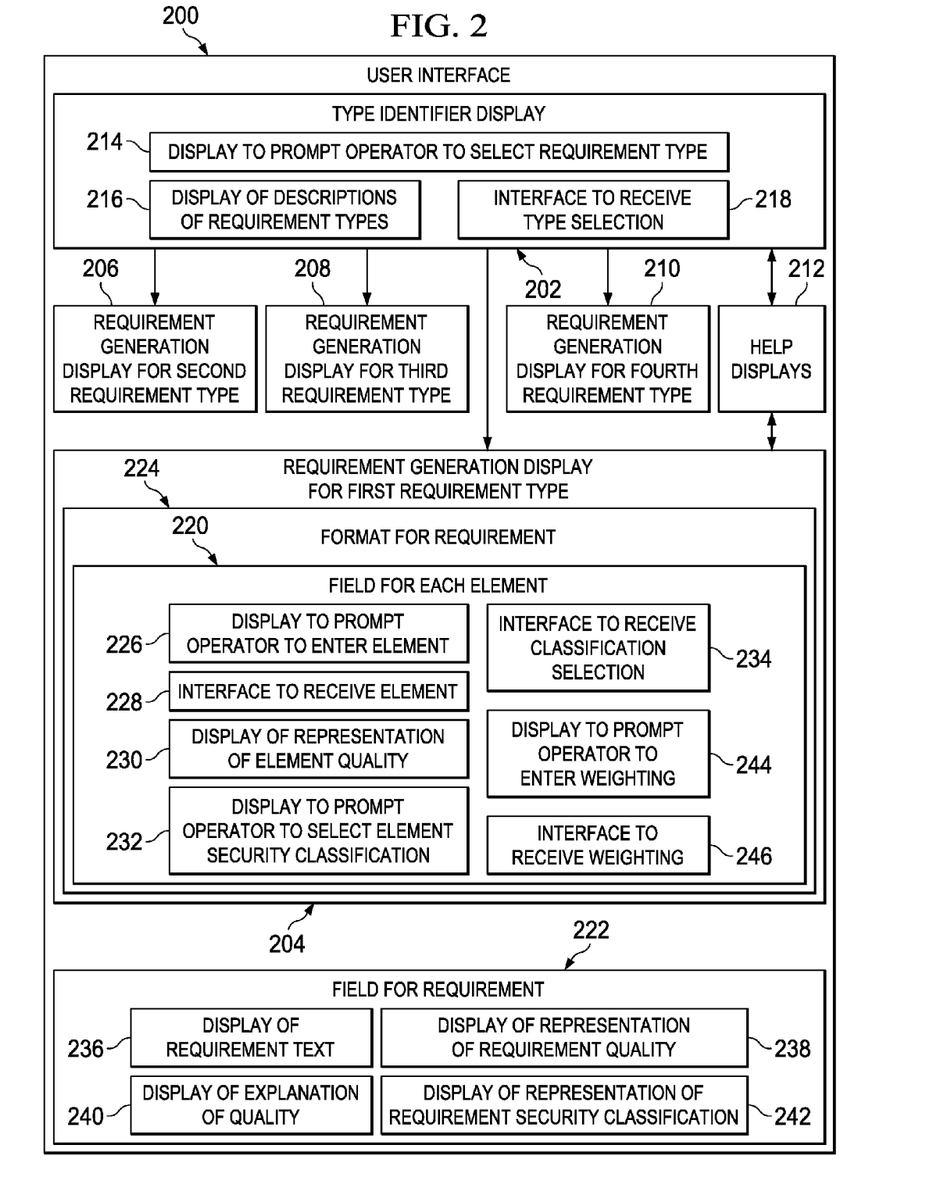
FIG. 2 is an illustration of a block diagram of a user interface in accordance with an advantageous embodiment.

Turning to FIG. 2, an illustration of a block diagram of a user interface is depicted in accordance with an advantageous embodiment. In this example, user interface 200 is an example of one implementation of user interface 124 in FIG. 1. User interface 200 may be a graphical user interface. User interface 200 may include type identifier display 202, requirement generation displays 204, 206, 208, 210, and help displays 212.

In this example, type identifier display 202 is an example of one implementation of a display that may be provided to receive user input identifying a type of requirement by identifier module 132 in FIG. 1. Type identifier display 202 includes display to prompt operator to select requirement type 214. Display to prompt operator to select requirement type 214 may prompt an operator to select from among a number of different types of requirements to be generated. To assist the operator in making a selection, type identifier display 202 may include display of descriptions of requirement types 216. Display of descriptions of requirement types 216 may display to the operator descriptions of the various different types of requirements that may be selected. Type identifier display 202 also includes interface to receive type selection 218. Interface to receive type selection 218 is configured to receive from the operator the selection of a type of requirement to be generated.

One of requirement generation display for first requirement type 204, requirement generation display for second requirement type 206, requirement generation display for third requirement type 208, or requirement generation display for fourth requirement type 210 is displayed in response to the selection of a type of requirement by the operator in type identifier display 202. User interface 200 may be configured to display more or fewer than four requirement generation displays, depending on the number of requirement types from which the operator may make a selection in type identifier display 202.

Taking one requirement generation display as an example, requirement generation display for first requirement type 204 includes field for each element 220 and field for requirement 222. Field for each element 220 includes a field for each element of a requirement of the type identified by the operator in type identifier display 202. Requirement generation display for second requirement type 206, requirement generation display for third requirement type 208, and requirement generation display for fourth requirement type 210 may include similar fields.

Field for each element 220 for a number of elements of the requirement are arranged in requirement generation display for first requirement type 204 in a manner that indicates format for requirement 224 for a requirement of the type identified by the operator in type identifier display 202. Format for requirement 224 may be based on the rules of grammar for a natural language. The characteristics of elements for a requirement and the arrangement of the elements forming the format for the requirement may be different for different types of requirements.

Therefore, although requirement generation display for first requirement type 204, requirement generation display for second requirement type 206, requirement generation display for third requirement type 208, and requirement generation display for fourth requirement type 210 may each have a field for each element and a field for the requirement, the characteristics of these fields and the arrangement of these fields in a particular requirement generation display 204, 206, 208, or 210 will depend upon the particular type of requirement identified by the operator in type identifier display 202.

Field for each element 220 may include display to prompt operator to enter element 226. Display to prompt operator to enter element 226 prompts the operator to enter or to select one or more words for an element of the requirement. Field for each element 220 may include interface to receive element 228. Interface to receive element 228 may receive the words entered or selected by the operator for the element. Field for each element 220 also may include display of representation of element quality 230. As discussed above, the quality level for an element of a requirement may be identified by a quality assessor based on the words of the element and quality criteria.

Display of representation of element quality 230 indicates the quality level of the element in field for each element 220. Display of representation of element quality 230 may display the representation of the quality level of the element in any form. For example, without limitation, display of representation of element quality 230 may display the quality level of the element as a numeric or alphanumeric value or using different colors or shapes to represent different quality levels or using these or any other representations in any combination.

In accordance with an advantageous embodiment, a quality level for a requirement may be identified by applying weightings to the quality levels for various elements forming the requirement. The weightings may be fixed based on the type of requirement. Alternatively, the weightings may be selectable by an operator. In this case, field for each element 220 may include display to prompt operator to enter weighting 244. Display to prompt operator to enter weighting 244 prompts the operator to select or otherwise enter the weighting that is to be applied to the quality level for the corresponding element when that quality level is used to identify the quality level for the requirement of which the element is a part. Field for each element 220 also may include interface to receive weighting 246. Interface to receive weighting 246 may be configured to receive the selection of a weighting from the operator.

Field for each element 220 may include display to prompt operator to select element security classification 232. Display to prompt operator to select element security classification 232 prompts the operator to select or otherwise enter a security classification for the element. For example, display to prompt operator to select element security classification 232 may prompt the operator to select from among a number of possible security classifications for the element. Field for each element 220 also may include interface to receive classification selection 234. Interface to receive classification selection 234 may be configured to receive the selection of a security classification for the element from the operator.

The field for each element for any particular element may include fewer displays and interfaces than those shown for example in field for each element 220. For example, a quality level may not be identified for a particular element of a requirement. In this case, the field for the element may not include a display of element quality, a display to prompt the operator to enter a weighting, and an interface to receive the weighting. As another example, a particular element of a requirement may not have an individual element security classification. In this case, the field for the element may not include a display to prompt the operator to select an element security classification and an interface to receive a classification selection.

Field for requirement 222 may include display of requirement text 236. Display of requirement text 236 is a display of the natural language text of the requirement. Display of requirement text 236 may be formed from the text of the elements of the requirement as entered or selected by an operator via field for each element 220 for each of the elements.

Field for requirement 222 also may include display of representation of requirement quality 238. A level of quality for the requirement may be identified based on the levels of quality for the elements that form the requirement. For example, without limitation, the level of quality for the requirement may be identified as the average of the levels of quality for the elements that form the requirement. As another example, the level of quality for the requirement may be identified as a weighted average of the levels of quality for the elements. In this case, the weightings used to determine the weighted average may be fixed based on the requirement type or may be selected by an operator, such as using field for each element 220.

Display of representation of requirement quality 238 may display the representation of the quality level of the requirement in any form. For example, without limitation, display of representation of requirement quality 238 may display the quality level of the requirement as a numeric or alphanumeric value or using different colors or shapes to represent different quality levels or using these or any other representations in any combination.

Field for requirement 222 also may include display of explanation of quality 240. Display of explanation of quality 240 may display the reasons why each element of the requirement has the quality level identified. Using display of explanation of quality 240, an operator may determine which element of the requirement should be modified to improve the quality of the requirement. Display of explanation of quality 240 also may be used by an operator to determine in what way an element of the requirement should be changed to improve the quality of the requirement. In accordance with an alternative embodiment, a display of an explanation of the quality level for each element also or alternatively may be displayed in field for each element 220 for the corresponding element.

Field for requirement 222 also may include display of representation of requirement security classification 242. The security classification for the requirement may be determined based on the security classifications for the elements of the requirement as selected or otherwise entered by the operator in field for each element 220. For example, the security classification for the requirement may be identified automatically as the highest security classification for any of the elements of the requirement.

In some cases, the combination of elements in the requirement may call for a security classification for the requirement as a whole that is higher than the security classification for any one of the elements of the requirement. In these cases, an operator may override the automatically identified security classification for the requirement and select or otherwise input a higher security classification for the requirement. In any case, the appropriate security classification for each element of a requirement and for the requirement as a whole may be defined with reference to a security classification guide for the project for which the requirement is being generated.

Display of representation of requirement security classification 242 is a display of the security classification for the requirement. Display of representation of requirement security classification 242 may display the representation of the security classification of the requirement in any form. For example, without limitation, display of representation of requirement security classification 242 may display the security classification of the requirement as a numeric or alphanumeric value or string, by using different colors or shapes to represent different security classifications, or by using any of these or other representations in any combination.

Help displays 212 provide information to help the operator to use other displays and interfaces provided by user interface 200. Help displays 212 may be available for any of the other displays or interfaces provided by user interface 200. For example, a number of the displays or interfaces of user interface 200 may include an option for displaying a corresponding one of help displays 212. When the operator selects such an option, one of help displays 212 with information for using the corresponding display or interface is displayed to the operator.

Figure 3:
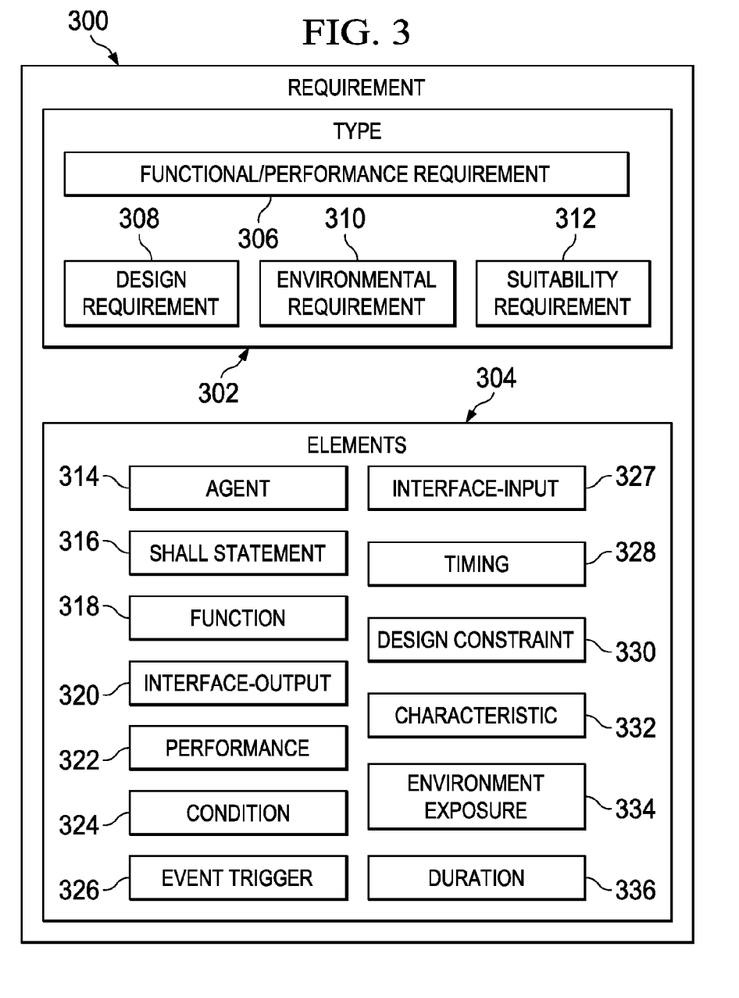
FIG. 3 is an illustration of a requirement in accordance with an advantageous embodiment.

Turning to FIG. 3, an illustration of a requirement is depicted in accordance with an advantageous embodiment. In this example, requirement 300 is an example of one implementation of requirement 106 in FIG. 1. Requirement 300 is defined by type 302. Requirement 300 is formed with number of elements 304. Type 302 defines characteristics of elements 304 that form requirement 300. Type 302 may define mandatory and optional elements 304 that form requirement 300. Type 302 also may define the order of elements 304 forming requirement 300. Thus, type 302 defines a format for requirement 300.

For example, without limitation, type 302 of requirement 300 may be functional/performance requirement 306, design requirement 308, environmental requirement 310, suitability requirement 312, or any other type of requirement. Functional/performance requirement 306 describes functional and performance behavior at the boundary of the item performing a required action or function. Functional/performance requirement 306 defines the input/output transformations at the boundary of the item. It defines the output response to some input trigger or system state condition, both observable at the item boundary.

Design requirement 308 describes how to design or fabricate an item or its elements. Design requirement 308 expresses mandatory characteristics concerning how to make a product or service, thereby constraining the design or fabrication of the item or its elements. Design requirement 308 may capture lessons learned to achieve desired performance by using proven design solutions. Design requirement 308 may address non-boundary items, such as parts, materials, and processes, and may provide a replacement for more complicated performance requirements. Design requirement 308 may result from prior experience with similar systems when a developer is to include a particular feature in the design solution. Design requirement 308 may include mandates on the use of specific legacy or other non-developmental items.

Environmental requirement 310 describes the exposed or generated environment through which an item must survive or function for all or part of its life cycle.

Elements 304 of environmental requirement 310 may specify the physical, radiant, chemical, and biotic factors that surround and affect the item. Examples of such factors include, without limitation, humidity, temperature, electromagnetic interference, pressure, and sand and/or salt spray.

Suitability requirement 312 describes the safety, security, reliability, availability, maintainability, or other health characteristics of an item. Suitability requirement 312 may also specify the allowable effect that the item may generate on the external environment. Suitability requirement 312 may describe the degree to which a system or end item can be placed satisfactorily in field use, with consideration given to availability, compatibility, transportability, interoperability, reliability, wartime use rates, maintainability, full-dimension protection, operational safety, human factors, architectural and infrastructure compliance, manpower supportability, logistics supportability, natural environmental effects and impacts, document and training requirements, and/or any other considerations either alone or taken into consideration together in any combination.

Type 302 of requirement 300 defines the information that should be or may be provided by elements 304 of requirement 300, as well as the arrangement of elements 304 to provide a desired format for requirement 300. Information for requirement 300 that is provided by elements 304 may include one or more of agent 314, shall statement 316, function 318, interface-output 320, performance 322, condition 324, event trigger 326, interface-input 327, timing 328, design constraint 330, characteristic 332, environment exposure 334, duration 336, and/or any other information that may be used to describe a characteristic of an item or service or an element thereof.

Agent 314 identifies an item performing a required action or function or possessing a required characteristic. Shall statement 316 links agent 314 with the actions or functions performed by agent 314 or other characteristics of agent 314. Shall statement 316 indicates the extent to which the following characteristics of agent 314 are mandatory or contractually binding.

For example, without limitation, shall statement 316 may be a word selected by a user from the words "shall", "may", "will", and "should" or other similar words or phrases, such as "must". In this example, "shall" indicates a provision that is binding. "Must" may be synonymous with "shall". "May" and "will" indicate non-mandatory provisions. "May" indicates permission. "Will" is often used to express a declaration of purpose or intent. "Should" indicates non-mandatory goals or objectives.

Function 318 describes the action or behavior of agent 314. Function 318 is what agent 314 does that is observable at its boundary. Interface-output 320 is the location where function 318 can be observed and evaluated and associated constraints. For example, without limitation, interface-output 320 may include an interface definition. Performance 322 is a measurable attribute of a function or design attribute which enables the determination of success or failure during verification of an item against requirement 300. Performance 322 is usually quantitative. Performance 322 describes the degree to which an application, system, or component accomplishes its designed functions within given constraints, such as speed, accuracy, or memory usage.

Condition 324 describes the circumstances under which agent 314 is to perform an action or function. Condition 324 may include states, modes, environments, limitations, special conditions, configurations, or combinations thereof which affect or limit the applicability of a requirement. A state or mode is a condition or combination of conditions that occurs under defined circumstances.

Event trigger 326 defines events observable at the boundary of agent 314 which initiate functions. Event trigger 326 may include system state transitions. Interface-input 327 defines a location where an initiating event can be observed and evaluated and associated constraints. For example, without limitation, interface-input 327 may include an interface definition. Timing 328 is a statement of how soon or how long is necessary for behavior associated with state changes and trigger conditions.

Design constraint 330 is a statement of a limitation on the design operation of agent 314. Characteristic 332 describes agent 314 while an environment is applied. Environment exposure 334 is a description of the environment that agent 314 is exposed to. Duration 336 describes the temporal extent to which a condition or environment is applied to agent 314.

Figure 4:
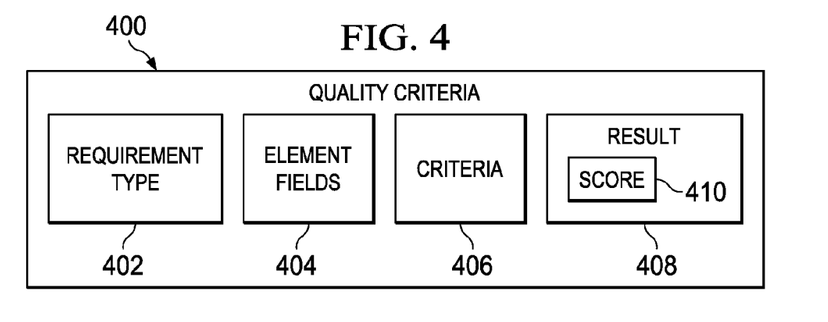
FIG. 4 is an illustration of quality criteria in accordance with an advantageous embodiment.

Turning to FIG. 4, an illustration of quality criteria is depicted in accordance with an advantageous embodiment. In this example, quality criteria 400 are examples of one implementation of quality criteria 122 in FIG. 1.

In accordance with an advantageous embodiment, quality criteria 400 are used to identify a quality level for individual elements of a requirement based on the type of requirement. Therefore, quality criteria 400 may be identified based on requirement type 402 and element fields 404 to which quality criteria 400 are applied. Quality criteria 400 includes criteria 406 and result 408 associated with requirement type 402 and element fields 404. Criteria 406 are applied to the words in one or more elements of a requirement of requirement type 402.

For example, criteria 406 may be applied to the words of the elements in element fields 404 of the requirement. Criteria 406 for requirement type 402 and element fields 404 may take into account words in one or more elements of the requirement, as well as other information.

Result 408 is the level of quality of the elements in element fields 404 as identified by applying criteria 406 to the words in the elements of the requirement. Result 408 may be identified in the form of score 410. For example, without limitation, score 410 may be an alphanumeric value or other indication of the identified level of quality for the elements in element fields 404. Score 410 preferably is selected from a range of scores comprising at least three different scores corresponding to at least three different levels of quality.

An example of quality criteria 400 will now be presented without limiting the scope of advantageous embodiments. The following example is not intended to represent actual quality criteria 400. Rather, the following example is provided to show an example of the types of information and the format of criteria 406 that may be used for quality criteria 400. Advantageous embodiments may or may not use the types of information used in or the format of quality criteria presented in this example. Advantageous embodiments may use quality criteria that are different in form or substance from the following example.

In accordance with one illustrative example, requirement type 402 may be a functional/performance requirement, and element fields 404 may be function. Thus, in this example, criteria 406 is applied to the words in elements of a functional/performance requirement. In this example, result 408 is the level of quality of the function element in the requirement as identified by applying criteria 406.

Continuing with this example, criteria 406 and result 408 for this example of quality criteria 400 may include the following:

Criterion: If ["Function"=null] or ["Function" contains 'word 1' or 'word 2']. Result: Function element score=0.

Criterion: If "Function" contains ("word 3" or "word 4" or "word 5" or any words in words list). Result: Function element score=1.

Criterion: If ["Interface-Output"=null] and ["Function"≠null (nor ("Function" contains any words in words list)) or [none of the other criteria apply]. Result: Function element score=2.

Criterion: If "Interface-Output" contains ("word 6" or "word 7" or "phrase 1"). Result: Function element score=3.

Criterion: If "Interface-Output" contains [("word 6" or "word 7" or "phrase 1") and ("word 8" or "word 9" or "word 10" or "word 11")]. Result: Function element score=4.

This example shows that criteria 406 of quality criteria 400 may take into account words in element fields 404 for which a quality level is being identified, as well as words in other element fields and other information. In this example, a quality level is being identified for the function element using criteria 406 that takes into account words in the function element, as well as words in an interface-output element of the requirement.

In this illustrative example, criteria 406 also makes reference to other information in the form of a list of words. For example, such a list may include words that should not be used in a requirement, because they may make the requirement ambiguous. This example also shows that criteria 406 of quality criteria 400 may take into account whether or not content is missing in one or more elements of a requirement, as well as whether or not the content that is present in an element is correct.

As depicted, criteria 406 and result 408 of quality criteria 400 are in the form of a series of if-then statements. If the words in one or more elements of the requirement satisfy criteria 406, then the element for element fields 404 is assigned score 410. Score 410 indicates the quality level of the element for element fields 404. In this illustrative example, the quality level of the element is indicated by a numerical score in the range of 0 to 4. A lower numerical score indicates greater ambiguity in the element. A higher score indicates less ambiguity in the element and, therefore, a higher quality element for a requirement.

Figure 5:
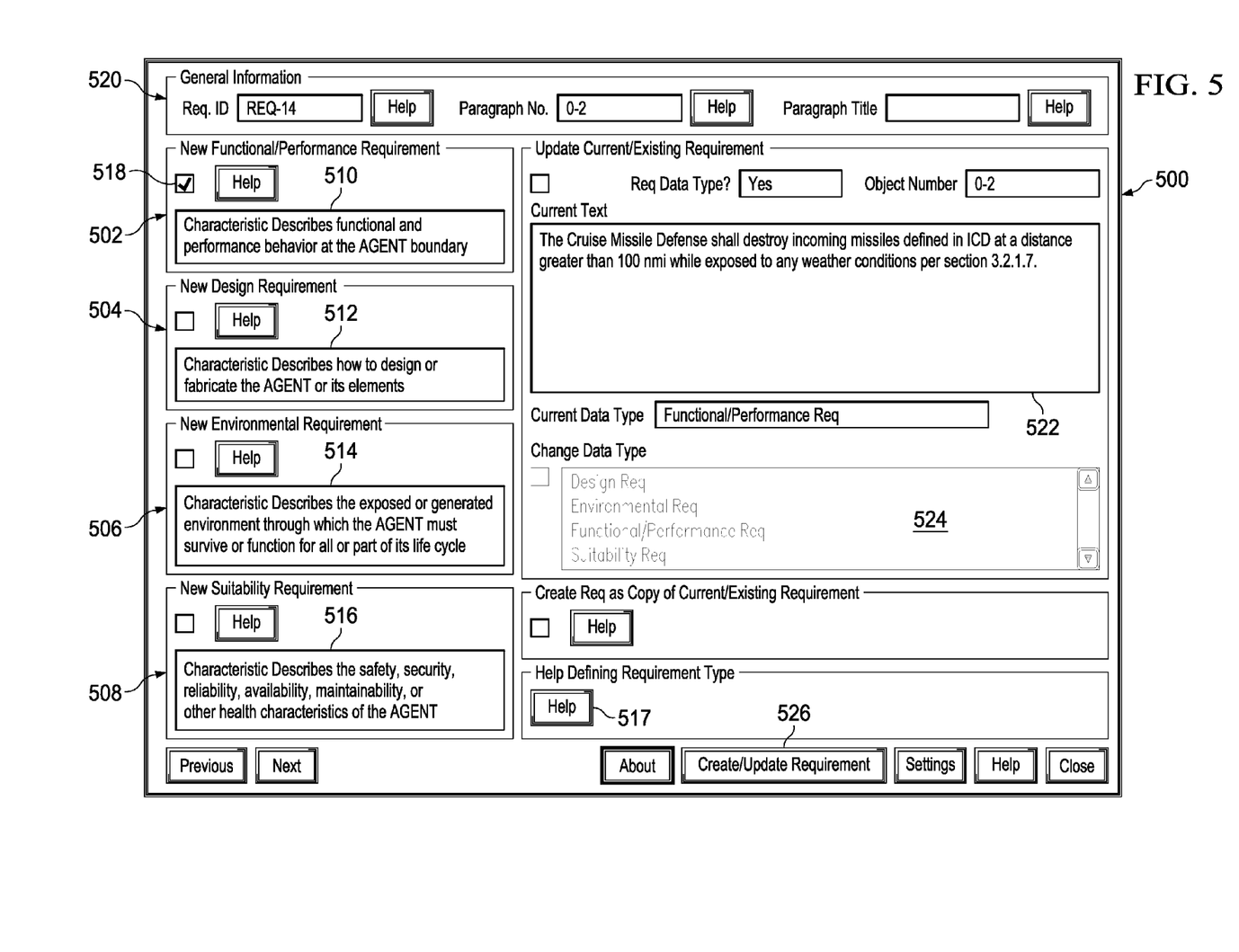
FIG. 5 is an illustration of a type identifier display in accordance with an advantageous embodiment.

Turning now to FIG. 5, an illustration of a type identifier display is depicted in accordance with an advantageous embodiment. In this example, type identifier display 500 is one example of type identifier display 202 in user interface 200 of FIG. 2.

Type identifier display 500 may be used by an operator to identify the type of a new requirement to be generated or to change the identified type of an existing generated requirement. In this example, the operator is prompted to select the type of requirement from among functional/performance requirement 502, design requirement 504, environmental requirement 506, or suitability requirement 508. Brief descriptions 510, 512, 514, and 516 of each type of requirement are provided to help the user to select the desired requirement type. The operator may select help button 517 for additional help with selecting the appropriate requirement type. The operator may select the desired requirement type by selecting an appropriate check box, such as check box 518.

Type identifier display 500 also allows the operator to enter and/or view general information 520 regarding the requirement to be created. For example, general information 520 may identify the requirement to be generated in relation to other requirements in a document or other application. General information 520 may identify the requirement to be generated in relation to a requirement management system in which the requirement will be used.

Type identifier display 500 also allows the operator to change the current requirement type for an existing requirement. For example, if type identifier display 500 is opened for an existing requirement, the current text of the requirement may be displayed as current text 522. The user may use menu 524 to change the current requirement type to a different requirement type. After the operator has finished selecting or changing the requirement type, create/update requirement type button 526 may be selected to move to the next display.

Figure 6:
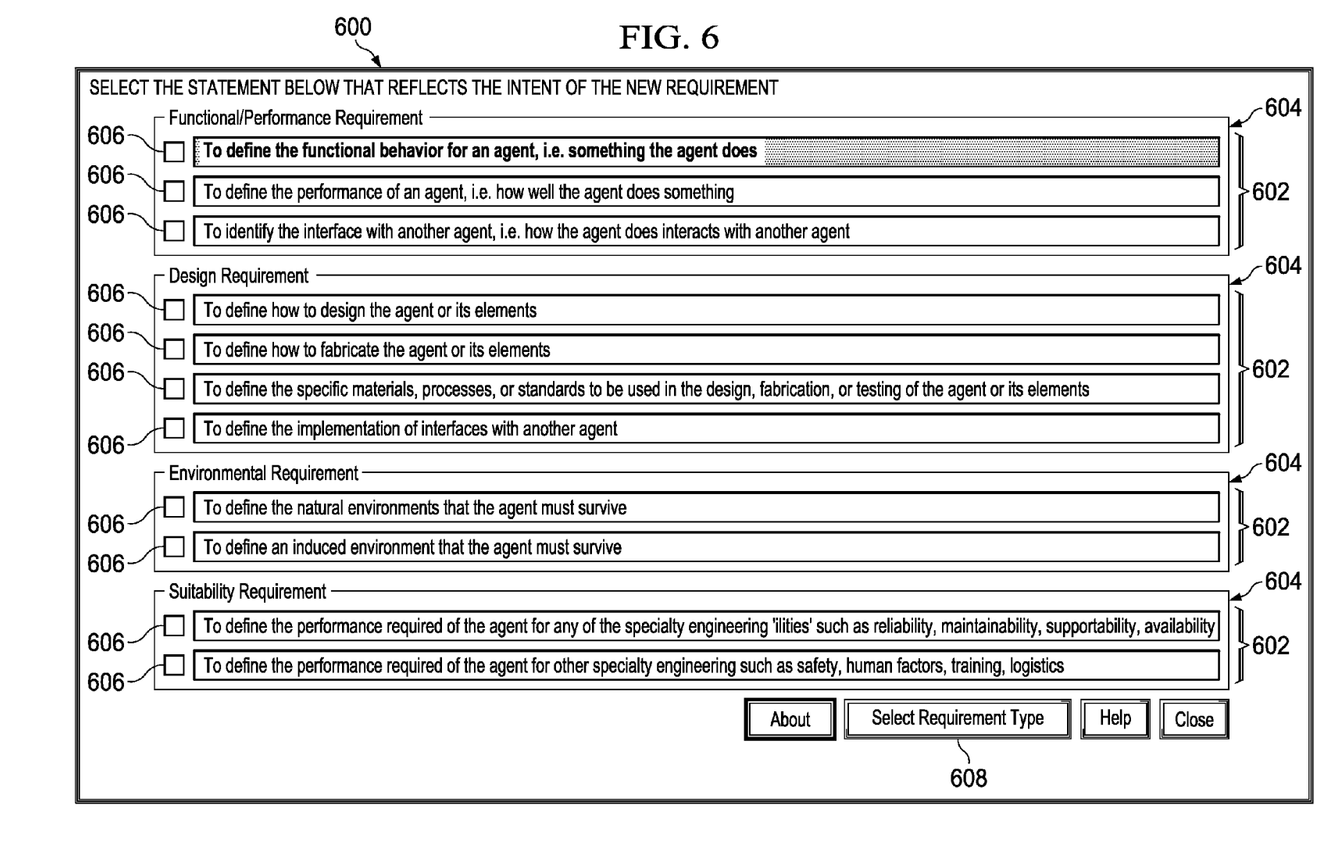
FIG. 6 is an illustration of a help display in accordance with an advantageous embodiment.

Turning now to FIG. 6, an illustration of a help display is depicted in accordance with an advantageous embodiment. In this example, help display 600 is one example of help displays 212 in user interface 200 of FIG. 2. Help display 600 may be displayed in response to an operator selecting help button 517 in type identifier display 500 in FIG. 5.

Help display 600 helps an operator to identify the appropriate requirement type for a requirement. In this example, help display 600 includes a number of statements 602 for each of a number of possible requirement types 604. The operator is prompted to select one of check boxes 606 corresponding to one of statements 602 that applies to the requirement to be generated. After selecting the appropriate check box for the one statement that applies to the requirement to be generated, the operator may select button 608 to select a requirement type. Selecting button 608 returns to type identifier display 500 in FIG. 5. In this case, the requirement type in type identifier display 500 may be selected automatically based on the one of check boxes 606 selected in help display 600.

Figure 7:
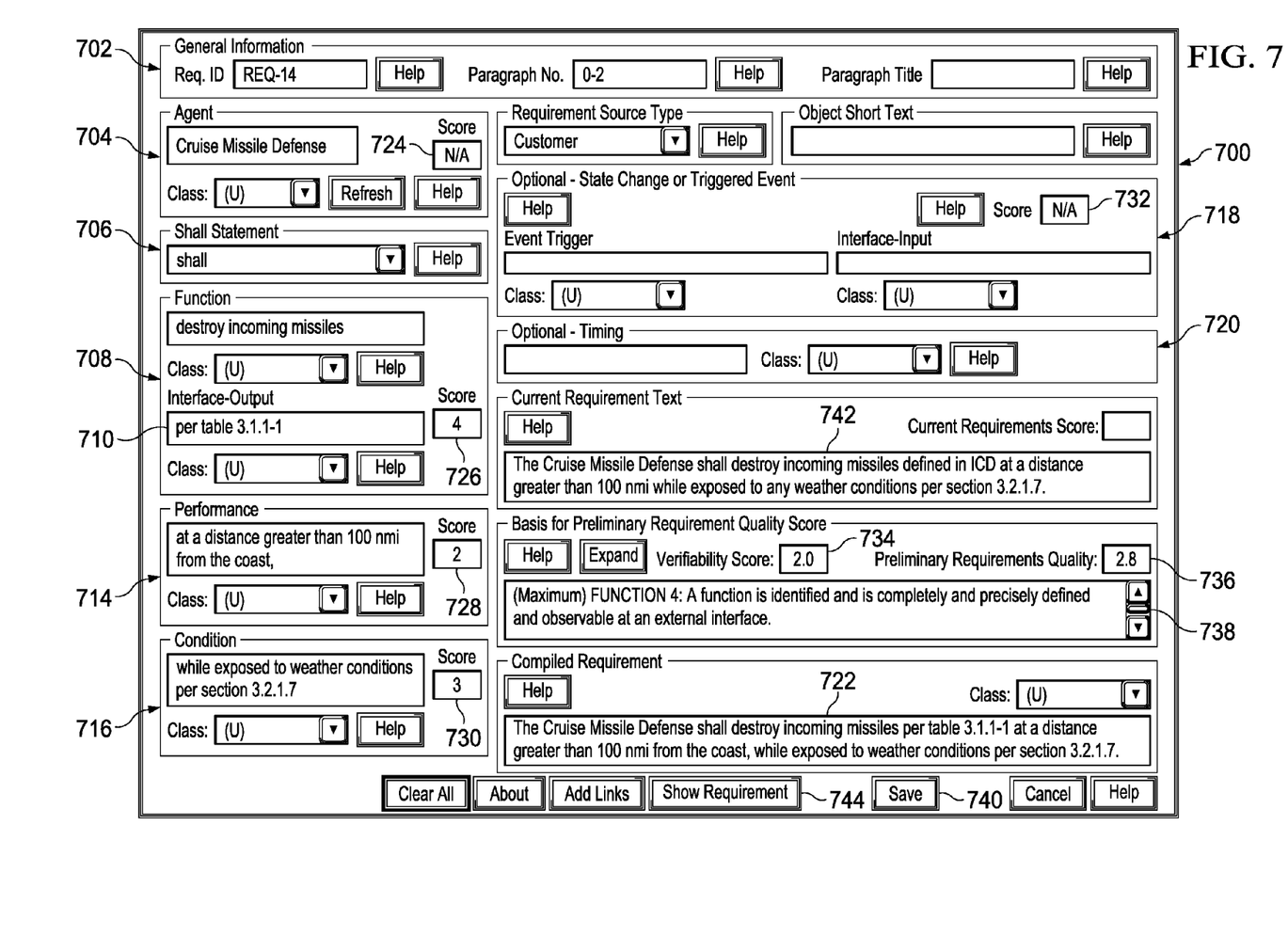
FIG. 7 is an illustration of a requirement generation display in accordance with an advantageous embodiment.

Turning now to FIG. 7, an illustration of a requirement generation display is depicted in accordance with an advantageous embodiment. In this example, requirement generation display 700 is an example of one implementation of requirement generation display for first requirement type 204 in user interface 200 of FIG. 2. In this example, requirement generation display 700 is for a functional/performance requirement. Requirement generation display 700, thus, may be presented in response to selecting create/update requirement type button 526 with check box 518 selected in type identifier display 500 in FIG. 5. Requirement generation display 700 includes general information 702 for the requirement being generated. General information 702 may be the same general information for the requirement from general information 520 in FIG. 5.

Requirement generation display 700 includes fields for receiving user input for the elements of the requirement. The fields that are displayed in any particular requirement generation display may depend upon the type of requirement. In this example, the fields for a functional/performance requirement include agent 704, shall statement 706, function 708, interface-output 710, performance 714, condition 716, state change or triggered event 718, and timing 720. In this example, state change or triggered event 718 and timing 720 are optional elements of a functional/performance requirement. The user is prompted by requirement generation display 700 to enter natural language text or to select from available natural language text options for the referenced fields corresponding to the mandatory elements of the requirement. The user also may enter natural language text or select from available natural language text options for fields in state change or triggered event 718 and timing 720 corresponding to optional elements of the requirement.

In accordance with an advantageous embodiment, the arrangement of agent 704, shall statement 706, function 708, interface-output 710, performance 714, condition 716, state change or triggered event 718, and timing 720 in requirement generation display 700 indicates the desired order of elements in the requirement based on the identified type of the requirement and rules of grammar for the natural language being used. Thus, the arrangement of the fields for agent 704, shall statement 706, function 708, interface-output 710, performance 714, condition 716, state change or triggered event 718, and timing 720 in requirement generation display 700 indicates the format for the requirement. Different types of requirements may have different desired formats. Therefore, the arrangement of fields in any particular requirement generation display will depend upon the type of requirement.

The requirement being generated by requirement generation display 700 may be displayed as compiled requirement 722. Compiled requirement 722 may be generated automatically from the user input for the elements of the requirement in the fields for agent 704, shall statement 706, function 708, interface-output 710, performance 714, condition 716, state change or triggered event 718, and timing 720. In this example, compiled requirement 722 is a statement in a natural language of humans; namely, English.

Quality scores 724, 726, 728, 730, and 732 may be identified and displayed for one or more of the elements entered in the fields for agent 704, shall statement 706, function 708, interface-output 710, performance 714, condition 716, state change or triggered event 718, and timing 720. Quality scores 724, 726, 728, 730, and 732 are generated based on the words entered or selected in one or more of the fields for agent 704, shall statement 706, function 708, interface-output 710, performance 714, condition 716, state change or triggered event 718, and timing 720 and quality criteria. Quality scores 724, 726, 728, 730, and 732 indicate the level of quality of the corresponding elements of the requirement. In this example, quality scores are represented as numerical values in the range from 0 to 4. Quality scores may not be identified for optional elements where no information is provided. In cases where quality scores are not identified for an element, the quality score may be presented as "N/A" or by using some other appropriate indicator.

Quality scores 734 and 736 present the level of quality for the requirement as a whole. Quality scores 734 and 736 for the requirement are identified based on quality scores 724, 726, 728, 730, and 732 for the elements of the requirement. Quality scores for elements for which no numerical quality score is identified are not used to identify quality scores 734 and 736 for the requirement. A number of quality scores for quality scores 734 and 736 may be provided for the requirement based on different ones of the quality scores 724, 726, 728, 730, and 732 for the elements.

For example, preliminary requirement quality score 736 may be determined automatically as the average of quality scores 724, 726, 728, 730, and 732 for the elements or by using some other formula. Verifiability quality score 734 may be determined automatically as the lowest one of quality scores 724, 726, 728, 730, and 732 for the elements. The determination of quality scores 734 and 736 for the requirement may be different for different types of requirements.

In this example, quality scores 734 and 736 are numerical scores in the range from 0 to 4. Scores in the range from greater than 3.5 to 4.0 may indicate a high quality requirement. In this case, all of the attributes of a high quality requirement are consistently satisfied in the elements of the requirement. Scores in the range from 3.0 to 3.5 may indicate a requirement of moderate quality. In this case, all of the attributes of a high quality requirement are inconsistently satisfied in the elements of the requirement. Some risks likely exist in using a requirement having a score in this range.

Scores in the range from 2.0 to less than 3.0 may indicate a requirement of low quality. In this case, the attributes of a high quality requirement are not often satisfied in the elements of the requirement. A program using requirements having scores in this range may be considered at moderate risk for design and verification. Scores in the range from less than 2.0 to 0 may indicate a requirement of poor quality. In this case, the attributes of a high quality requirement are generally not satisfied in the elements of the requirement. A program using requirements having scores in this range may be considered at high risk for design and verification.

Explanations 738 of the basis for quality scores 724, 726, 728, 730, and 732 for the elements that are used to identify quality scores 734 and 736 for the requirement may be displayed in requirement generation display 700. Explanations 738 may provide reasons for why a particular quality score was identified for a particular element of the requirement. Thus, explanations 738 identify which elements of the requirement should be modified to increase the quality of the requirement and suggest how such elements may be changed.

After generating a requirement using requirement generation display 700, the operator may save the requirement by selecting save button 740. Selecting save button 740 saves the requirement shown in compiled requirement 722 as the current requirement.

Requirement generation display 700 also may be used to edit an existing requirement. In this case, the existing requirement is displayed as current requirement 742, and the elements of the existing requirement are used to populate the corresponding fields for agent 704, shall statement 706, function 708, interface-output 710, performance 714, condition 716, state change or triggered event 718, and timing 720. As the operator edits the elements in the fields for agent 704, shall statement 706, function 708, interface-output 710, performance 714, condition 716, state change or triggered event 718, and timing 720, the text of the requirement displayed in compiled requirement 722 may change. However, the text of the requirement as displayed in current requirement 742 does not change until the user selects save button 740. In any case, as the operator creates or edits the elements in the fields for agent 704, shall statement 706, function 708, interface-output 710, performance 714, condition 716, state change or triggered event 718, and timing 720, the operator may update quality scores 724, 726, 728, 730, 732, 734, and 736 and compiled requirement 722 to take into account any changes by selecting show requirement button 744.

Figure 8:
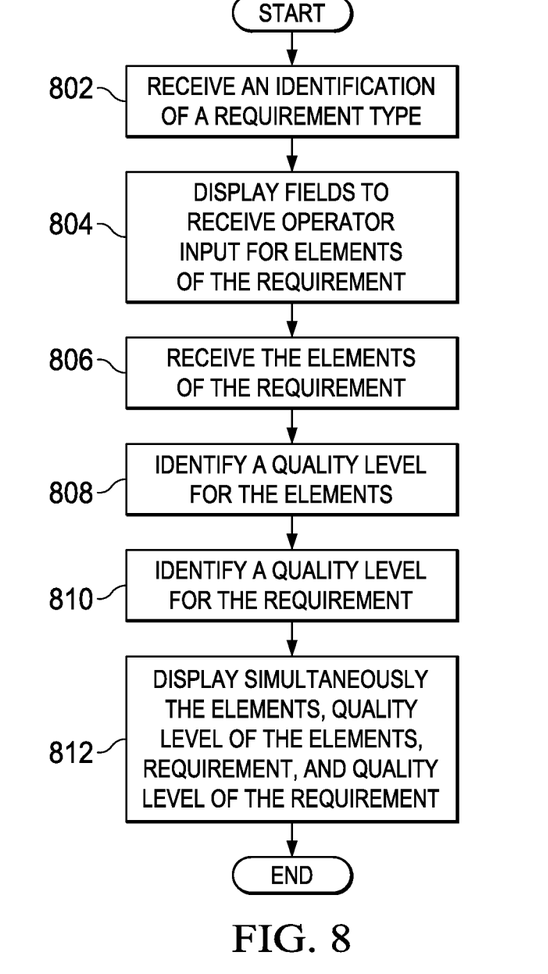
FIG. 8 is a flowchart of a process for generating a requirement in accordance with an advantageous embodiment.

Turning to FIG. 8, a flowchart of a process for generating a requirement is depicted in accordance with an advantageous embodiment. In this example, the process in FIG. 8 may be performed by requirement generator 102 in FIG. 1.

The process begins by receiving an identification of a type of the requirement to be generated (operation 802). Operation 802 may include receiving the requirement type from an operator via a type identifier display of a graphical user interface. Fields to receive operator input for the elements of the requirement are then displayed (operation 804). In accordance with an advantageous embodiment, operation 804 includes displaying the fields in an arrangement that indicates a desired format for the requirement based on the type of requirement identified in operation 802. Operation 804 may include displaying the fields to receive the operator input for the elements in a requirement generation display of the graphical user interface. The elements of the requirement are then received (operation 806).

A quality level for the elements is identified (operation 808). Operation 808 may include identifying the quality level for the elements based on the words in the elements and quality criteria. A quality level for the requirement is then identified (operation 810). Operation 810 may include identifying the quality level for the requirement based on the quality levels for the elements identified in operation 808. The elements, the quality level of the elements, the requirement, and the quality level of the requirement are then displayed simultaneously (operation 812), with the process terminating thereafter.

One or more of the advantageous embodiments provides a method and apparatus for generating structured, natural language, text-based requirements. In accordance with an advantageous embodiment, requirements are generated from well-defined elements of high quality requirements. A quality evaluation is provided to the requirement writer as the requirement is being generated.

The quality evaluation provides specific guidance regarding which elements of the requirement should be included and improved and how they should be modified to improve requirement quality. A method and apparatus in accordance with an advantageous embodiment enables an operator to consistently prepare high-quality text-based requirements with minimal training. A method and apparatus in accordance with an advantageous embodiment may be used in combination with a variety of requirement management tools.

Figure 9:
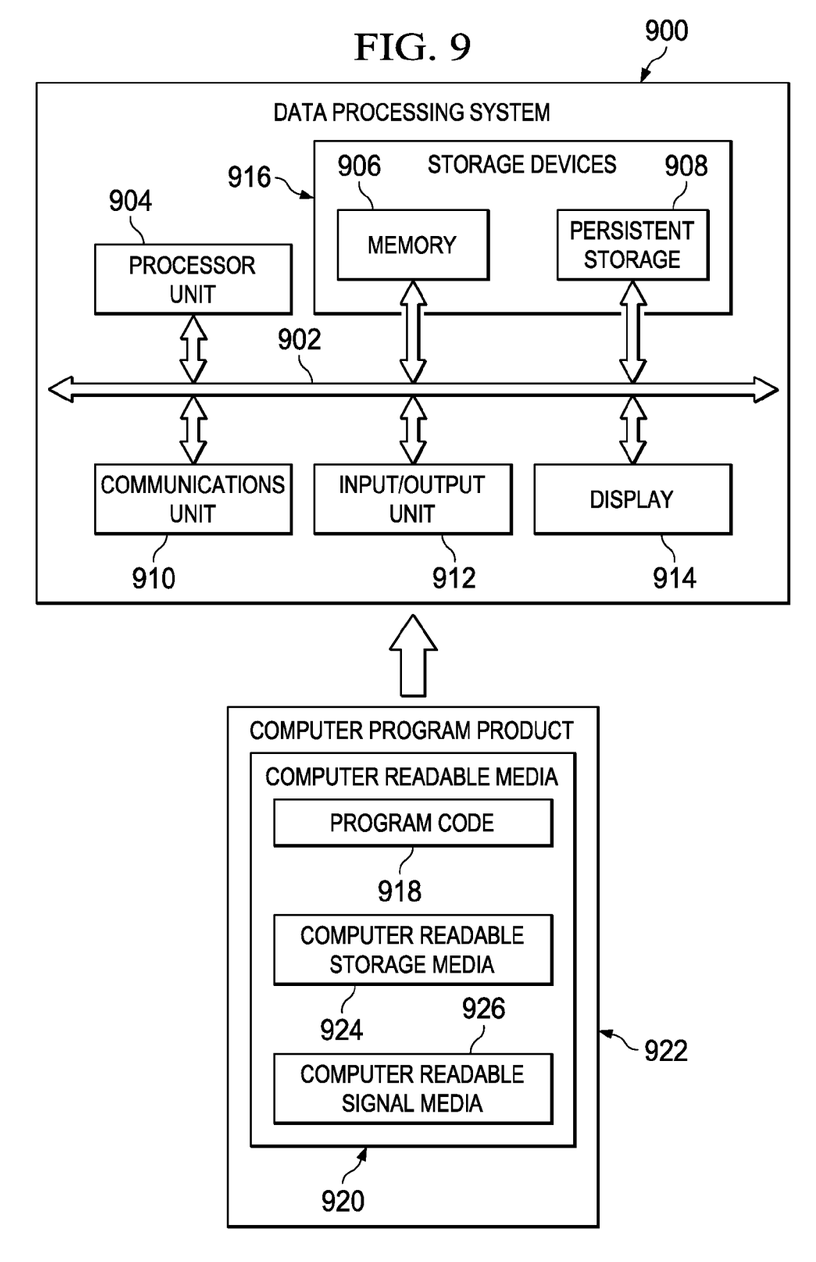
FIG. 9 is an illustration of a data processing system in accordance with an advantageous embodiment.

Turning now to FIG. 9, an illustration of a data processing system is depicted in accordance with an advantageous embodiment. In this example, data processing system 900 is an example of a data processing system that may be used to implement one or more computers in computer system 114 in FIG. 1. In this advantageous example, data processing system 900 includes communications fabric 902. Communications fabric 902 provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another advantageous example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 may also be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications fabric 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program instructions, program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926. Computer readable storage media 924 may include, for example, an optical or magnetic disk that is inserted or placed into a drive or other device that is part of persistent storage 908 for transfer onto a storage device, such as a hard drive, that is part of persistent storage 908.

Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different advantageous embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, data processing system 900 may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications fabric 902 and may be comprised of one or more buses, such as a system bus or an input/output bus. Of course, the bus system may be implemented using any suitable type of architecture that provides for a transfer of data between different components or devices attached to the bus system.

Additionally, communications unit 910 may include a number of devices that transmit data, receive data, or transmit and receive data. Communications unit 910 may be, for example, a modem or a network adapter, two network adapters, or some combination thereof. Further, a memory may be, for example, memory 906, or a cache, such as found in an interface and memory controller hub that may be present in communications fabric 902.

The description of the different advantageous embodiments has been presented for purposes of illustration and description and is not intended to be exhaustive or to limit the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an identifier module comprising a processor unit configured to identify a type of a requirement;
    a formatter module comprising a processor unit configured to display a format for the requirement based on the type of the requirement and to display fields to receive a user input for elements of the requirement, wherein the fields are arranged based on rules of grammar for a natural language;
    an analyzer module configured to generate a score for the user input for the elements and to generate a score for the requirement based on the score for the user input for the elements; and
    a user interface system configured to display simultaneously the user input for the elements, the score for the user input for the elements, the requirement, and the score for the requirement.

2. The apparatus of claim 1, wherein the analyzer module is configured to identify whether content is missing in the user input for the elements for the type of the requirement.

3. The apparatus of claim 1, wherein the analyzer module is configured to identify whether content is correct in the user input for the elements for the type of the requirement.

4. A method for generating a requirement comprising:
    receiving an identification of a type of the requirement;
    displaying fields to receive a user input for elements of the requirement based on the type of the requirement, wherein the fields are arranged based on rules of grammar for a natural language;
    receiving a group of elements of the requirement comprising words in a natural language;
    generating scores for the elements based on the words in the elements and quality criteria, wherein the quality criteria associate specified words in the natural language with corresponding scores;
    generating a score for the requirement based on the scores for the elements; and
    displaying simultaneously the elements, a representation of the scores for the elements, the requirement, and a representation of the score for the requirement.

5. The method of claim 4 further comprising displaying an explanation of the scores for the elements.

6. The method of claim 4, wherein the score for the requirement is an alphanumeric score selected from a range of scores comprising at least three scores.

7. The method of claim 4 further comprising:
    receiving a security classification for the elements; and
    determining a security classification for the requirement based on the security classification for the elements.

8. The method of claim 4, wherein generating the scores for the elements comprises identifying whether content is missing in the elements for the type of the requirement.

9. The method of claim 4, wherein generating the scores for the elements comprises identifying whether content is correct in the elements for the type of the requirement.

10. The method of claim 4, wherein the requirement is a statement in a natural language of humans.

* * * * *